United States Patent
Weisz et al.

(10) Patent No.: US 7,127,821 B1
(45) Date of Patent: Oct. 31, 2006

(54) AUTOMATED METHOD AND APPARATUS FOR DISTANCE MEASUREMENT

(75) Inventors: Tiberiu Weisz, Jamaica, NY (US); Dan Tyroler, 37 Baker Hill Rd., Great Neck, NY (US) 11023

(73) Assignee: Dan Tyroler, Great Neck, NY (US)

( * ) Notice: Subject to any disclaimer, the term of this patent is extended or adjusted under 35 U.S.C. 154(b) by 0 days.

(21) Appl. No.: 11/133,649

(22) Filed: May 20, 2005

(51) Int. Cl.
*G01B 11/14* (2006.01)
(52) U.S. Cl. .......................................... 33/277; 33/286
(58) Field of Classification Search ............ None
See application file for complete search history.

(56) References Cited

U.S. PATENT DOCUMENTS

| | | | | |
|---|---|---|---|---|
| 5,493,786 A | * | 2/1996 | Thomson | 33/1 G |
| 5,983,510 A | * | 11/1999 | Wu et al. | 33/227 |
| 6,199,292 B1 | * | 3/2001 | Ebeling | 33/775 |
| 6,453,568 B1 | * | 9/2002 | Hymer | 33/276 |
| 6,532,675 B1 | * | 3/2003 | Letourneau | 33/277 |
| 6,560,560 B1 | * | 5/2003 | Tachner | 702/164 |
| 6,694,629 B1 | * | 2/2004 | Goodrich | 33/286 |
| 6,763,598 B1 | * | 7/2004 | Chen | 33/286 |

OTHER PUBLICATIONS

U.S. Appl. No. 11/021,776, filed Jun. 29, 2006, Tyroler.

* cited by examiner

*Primary Examiner*—Christopher W. Fulton
(74) *Attorney, Agent, or Firm*—Gottlieb, Rackman & Reisman, P.C.

(57) ABSTRACT

A device for measuring physical characteristics includes a beam generator selectively generating a target beam. The device further includes two angle detectors that measure the respective angles between the beams and, respectively a vertical and a horizontal axis. The device further includes a calculator that calculates the distances to said points as well as the distance between the two points.

14 Claims, 3 Drawing Sheets

AUTOMATED METHOD AND APPARATUS FOR DISTANCE MEASUREMENT

RELATED APPLICATIONS

This application is related to application Ser. No. 11/021,776 filed Dec. 23, 2004 entitled Method and Apparatus for Distance Measurement, incorporated herein by reference, now U.S. Pat. No. 7,086,162.

BACKGROUND OF THE INVENTION a. Field of Invention

This application pertains to an automatic apparatus and method for measuring various dimensions such as the distance between two points. More specifically, the distance is obtained from a remote location by measuring the distances from the remote location to each of the points, measuring other parameters to determine the distance therebetween, wherein preferably a single laser device is used to make all the measurements. Other dimensions characteristic of objects such areas, volumes and/or relative positions of different objects are obtained by using three or more points.

b. Description of the Prior Art

It is frequently important to measure the distance between two points. For example, surveyors have a large number of tools and devices and disposal to measure the distances between landmarks, as well as their elevation and relative bearing.

Contractors and other professionals in the building industry often need to measure distances between various critical points as well. Traditionally this was accomplished by extending or laying down a measuring tape between the two points and reading the distance from the tape. If the tape was too short, or if there are obstacles between the points, then intermediate measurements are made along the path between the two points. Of course, this process is tedious and time-consuming. Moreover, in some instances, one or both points of interest are inaccessible and therefore the distance between them can be determined using indirect means or approximations.

Recently, the task of measuring devices has been eased somewhat by the availability of electronic measurement devices. These devices are now readily available and work by sending out an ultrasound, laser or other types of beams and determining the transit time required for the beam to reach the selected point, and return. One such device, called the Laser Dimension Master is made by Calculated Industries of Carson City, Nev. The device has a head rotatable between two perpendicular positions and generates an ultrasound beam for making measurements and a visible laser beam for aiming the device. While these devices are easy to use, most of them can still only measure the distance from the measuring device and a remote point and cannot be used from a remote location to measure the distance between two arbitrary points. One exception presently known are the laser measuring device made by Lasermeters of Edmond, Okla. (See Lasermeters.com). This company makes a line of devices under the name of Disto. A Disto device can be used to measure the distance between two points using three measurements. First, the device is directed at the first point and a measurement is taken. Next, the device is directed at an intermediate point disposed along a perpendicular line to the line between the two points and a second measurement is taken Finally, the device is directed at the second point and a third measurement is taken. The distances between the first point, the intermediate point, and the second point are determined using the Pythagorean theorem, and then added. This approach has many problems which render it impractical for most applications. First, the user must determine by eye the location of the intermediate point. Obviously this process introduces a degree of uncertainty and inaccuracy. Second, in most instances, except in very special instances, the intermediate point does not even fall between the two points, in which case, the distances must be subtracted, not added. Devices are also known that measure electronically the orientation of an object with respect to the North Pole. These devices or electronic compasses are used in various transportation means for navigation, in surveying devices, and so on. Moreover, historically, devices were well known, such as water bubbles and plumb lines that could be used to determine whether a flat member or surface was truly vertical or horizontal or to indicate the angle between a surface and a vertical or horizontal axis. More recently, devices have become available that measure such angles electronically and provide a digital signal indicative of the angle of a selected surface or line and either the vertical or horizontal axis. One such device is the Macklanburg-Duncan Electronic Digital Protractor available from Sears, Inc. of Chicago-part NO. #00940195000.

SUMMARY OF THE INVENTION

Briefly, a device for measuring the distance between two arbitrary points according to this invention includes means for determining the lengths A, B of two reference lines between a reference point and the arbitrary points includes means for determining the vertical angles VA, VB of each line with respect to a vertical axis, means for determining the bearing or orientation angles OA, OB of each line with respect to a horizontal axis, and means for calculating the distance between the points from said lengths A, B and said angles VA, VB, OA, OB. The determination is made using standard geometric formulas. Preferably the angles VA, VB, OA, OB are determined using electronic angle detectors. The distances A and B are determined by generating a measuring beam from the device to points P1 and P2. The beam may be generated by a laser and may include a visible light, a UV or IR beam of light, an ultrasonic beam, etc. If the beam is not visible, an aiming beam may also be generated that is either very close to the measuring beam, or is coincident therewith. The measuring beam(and the aiming beam, if any) fall on points P1 and P2 and a sensor is used to detect a corresponding reflected beam. Standard techniques are used to compare the measuring beam and the reflected beam characteristics and to derive therefrom the distance to the respective point. If necessary, a reflector is placed at the points to which measurements are desired. The reflector insures that the reflected beam is strong enough so that it is detected by the sensor means.

In one embodiment, the device is operated as follows. The user points the device so that the measuring beam (and the aiming beam, if any) impinges or falls on a selected first point. The automatic elements of the device then measure the distance A to the first point, as well as the geographic orientation OA and the vertical angle of the beam VA with respect to a vertical axis. The device is aimed at the second point and the same parameters are obtained for this point. The parameters are used to measure the distance between the two points. By using the same parameters, and/or by targeting other points, other characteristics of an object, such as a building may be obtained as well. For example the device can be used to measure, height, width, vertical and horizontal orientation, area of one or more surfaces, the volume of various enclosures, and so on.

DETAILED DESCRIPTION OF THE PREFERRED EMBODIMENT

Figure 1:
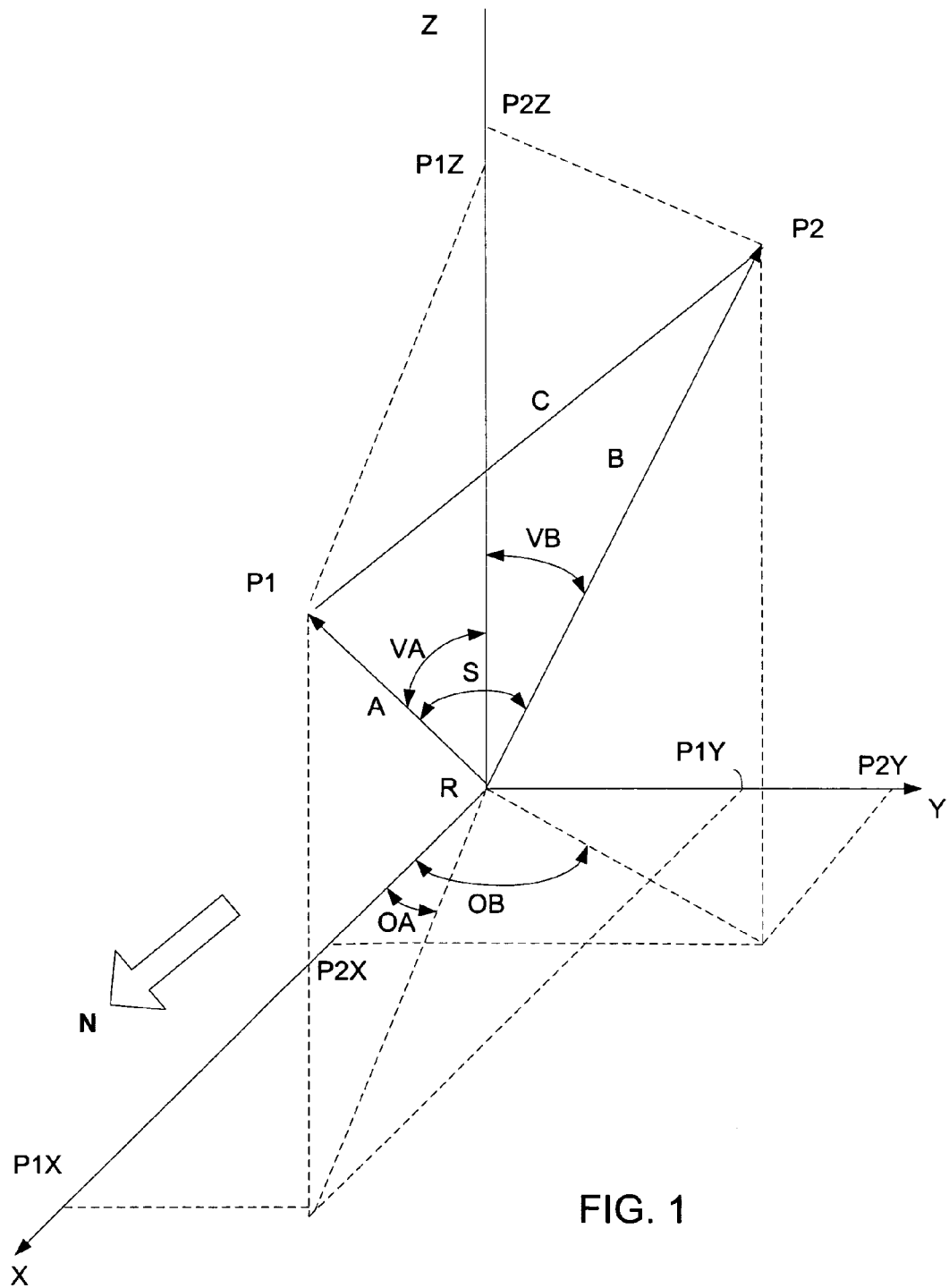
FIG. 1 shows a somewhat diagrammatic view of how a device constructed in accordance with this invention is used to measure the distance between two arbitrary points.

Referring now to FIG. 1, a device constructed in accordance with this invention is used to determine the distance C between two points P1 and P2. The two points can be two different objects, or they can be points disposed on the same object. The distance C is determined by pointing device at reference location R at point P1 and determining the distance A from the device to P1. In addition, the device also determines the vertical angle VA of line RP1 with respect to vertical axis Z—Z as well as an orientation angle or bearing OA of line RP1 and a horizontal reference line. Preferably the horizontal reference line is the imaginary line to the North Pole as indicated by a compass and used in navigation and surveying. Next, the device at reference R is also targeted at point P2 and the length B of line RP2 is determined, together with its vertical angle VB and orientation angle OB. From these parameters the distance C is determined, using standard geometrical formulas.

Figure 2:
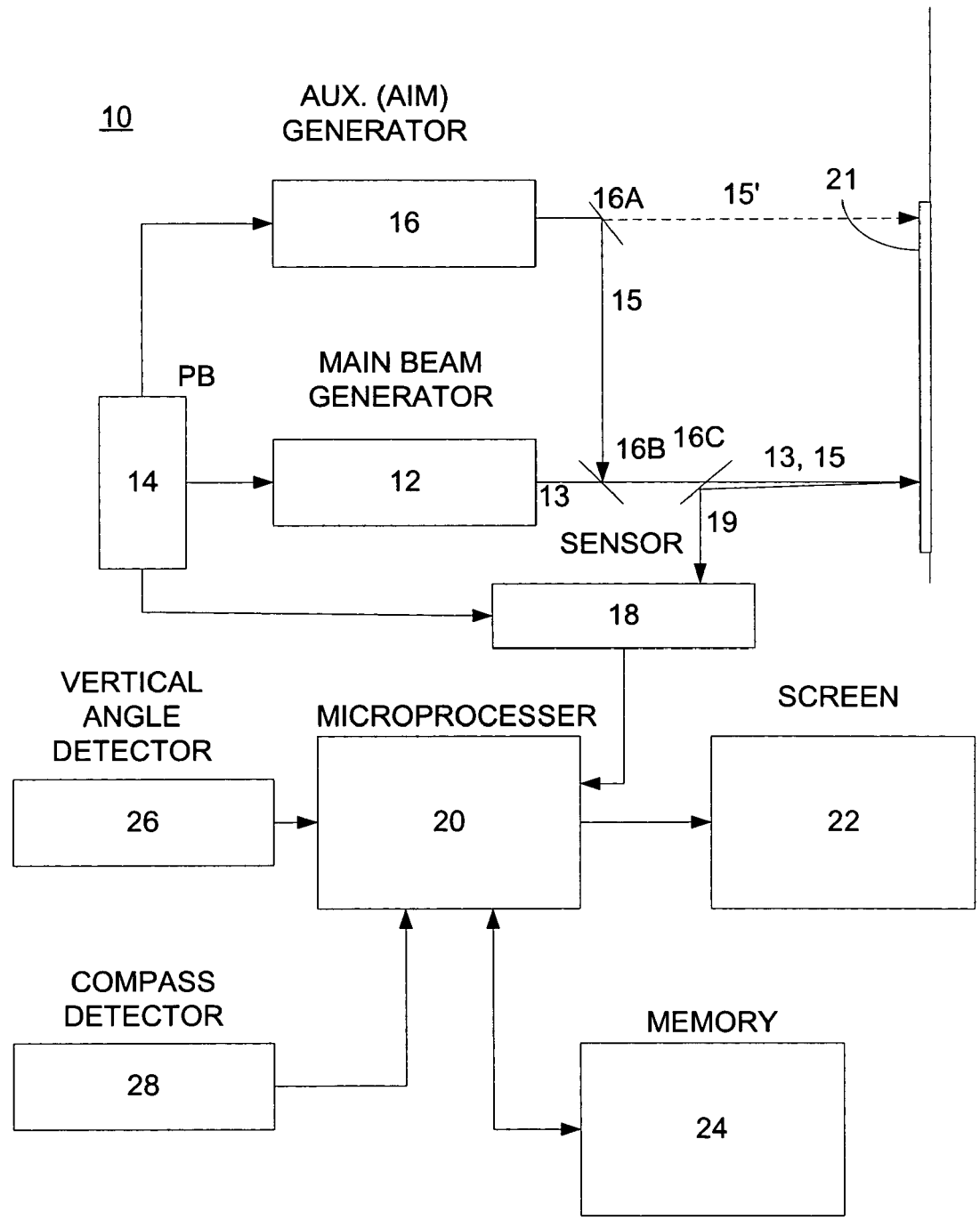
FIG. 2 shows a somewhat diagrammatic block diagram of the device.

FIG. 2 shows a block diagram the device 10. The device 10 includes a measuring or main beam generator 12 that is controlled by a push-button 14 or other similar control means. When the push-button 14 is activated, the generator 12 generates a main beam 13 that is targeted at any point P. This beam may be a visible laser beam, an ultrasound beam, an infrared beam, etc. If the beam generated by generator 12 is not visible, a secondary or aiming beam generator 16 is used to generate a secondary beam 15. Beam 15 may be a tightly focused light beam, collimated beam, a visible laser beam etc. The purpose of beam 15 is to assist the user in the aiming of main beam 13 on point P. In one embodiment, well-known superposition means (such as mirrors 16A, 16B) are used to superimpose beam 15 or beam 13 so that they are coincident. Preferably mirror 16A is fully coated to refract beam 15 as shown. Mirror 16B is partially coated so that beam 13 passes through it and beam 15 is reflected/ Instead of coating, the mirror 16B may also be made with an aperture or clear window through which the beam 13 propagates.

Alternatively, the mirrors 16A, 16B are omitted and beams 13, 15' are in parallel at a very close distance to each other as compared to the distance to point P.

At point P, the main beam 13 (or at least a portion thereof) is reflected from point P and this reflected beam 19 is directed by another partially coated mirror 16C at a sensor 18. The sensor 18 may be on all the time, or is activated by switch 14 as well. The sensor 18 generates an output signal indicative of the distance to the point P.

This signal is fed to a microprocessor 20. In one embodiment, when push-button 14 is activated, the beam(s) 13, 15 are sent to the target and the sensor 18 starts generating a signal indicative of said distance. The microprocessor 20 can then calculate the distance to point P in real time in the usual manner and this distance is displayed on a display or screen 22 and stored in a memory 24. In an alternate embodiment, the microprocessor 20 receives the data and but does not calculate the distance to point P until the push-button 14 is released. One skilled in the art understands that device may operate in many other modes as well.

Importantly, in the present invention, the device 10 further includes two more detectors. Detector 26 is an electronic level detector that determines from the position of device 10 the angle of beams 13, 15 with respect to a vertical axis. These types of detectors are well known in the art and are used frequently in surveying and construction to determine if a member is truly horizontal or vertical. Detector generates an output V indicative of this angle.

Detector 28 is used to determine the geographic orientations or bearings of the beams 13, 15. For example, detector 28 maybe an electronic compass, such as ones made for navigation for vehicles, and other similar devices. The detector 18 generates an output O indicative of the bearing of the beams 13, 15.

The parameters O, V are also fed to the microprocessor 20. Again, the detectors 26, 28 can provide these parameters continuously or when push-button 14 is activated or released. Alternatively, other control means may be used to activate the detectors 26, 28 and generate respective outputs.

As discussed above, to make a measurement involving two points, the device is targeted at the first point, e.g., P1, the push-button 14 is activated and the distance A and angles VA and OA are determined. The device is then targeted at the second point P2, the same push-button 14, or a different push-button is activated, and the parameters B, VB and OB are determined. Next, a relevant parameter, e.g., distance C is determined. The distance can be shown in screen 22, optionally together with any of the parameters discussed above, In an alternate embodiment, the data is collected from sensor 18 and detectors 26, 28, need not be processed immediately. These parameters are all stored in memory 24. Signal processing and the calculation of distance C (or any other parameters can occur while the device is pointed at the second point, or even later).

Once the parameters A, B, VA, VB, OA, OB are determined, the distance C and many other parameters are calculated using standard geometric formulas. For example, it is well known that in the particular configuration shown in FIG. 2 the angle S between lines RP1 and RP2 is related to the other angles by the formula:

$$\cos S = \cos(VA-VB)\cos(OA-OB).$$

Then the distance C can be calculated by using the law of cosines:

$$C^2 = A^2 + B^2 - 2AB \cos S.$$

Other formulas may be used as well.

The range of the device 10 is dependent on a number of factors, including the reflectivity of the targeted objects at points P1, P2, the efficacy and sensitivity of sensor 18, and so on. In some cases, a reflective surface 21 can be placed at either or both points P1 and P2. The surfaces may include a metallic surface, a mirror, a polished surface, or other material that reflects the beam 13 effectively so that the reflected beam 19 has a high enough intensity to be detected by sensor 18.

As mentioned above, device 10 can be used to determine not only the distance between two points but other parameters as well, using standard geometric formulas. For example, using standard geometry, device 10 can be used to measure the height of a building by measuring the distance along a vertical line between two points, one point being at the top and the other point being at the bottom. These two points can but need not be on the same vertical line. Similarly, the width of a building can be determined as well as other characteristics, such as the angle of a wall or floor with respect to vertical or horizontal axis, the orientation of a wall with respect to an axis defined by a compass, etc. The device may also be targeted at three or more lines and the resulting parameters may be used to determine various other parameters, such as area, slope, volume, etc. For example, a painter can walk into a room, point at its eight corners with device 10, and the device 10 can automatically, calculate the total surface area of the room (with or without the ceiling) and indicate how much paint was required.

Figure 3:
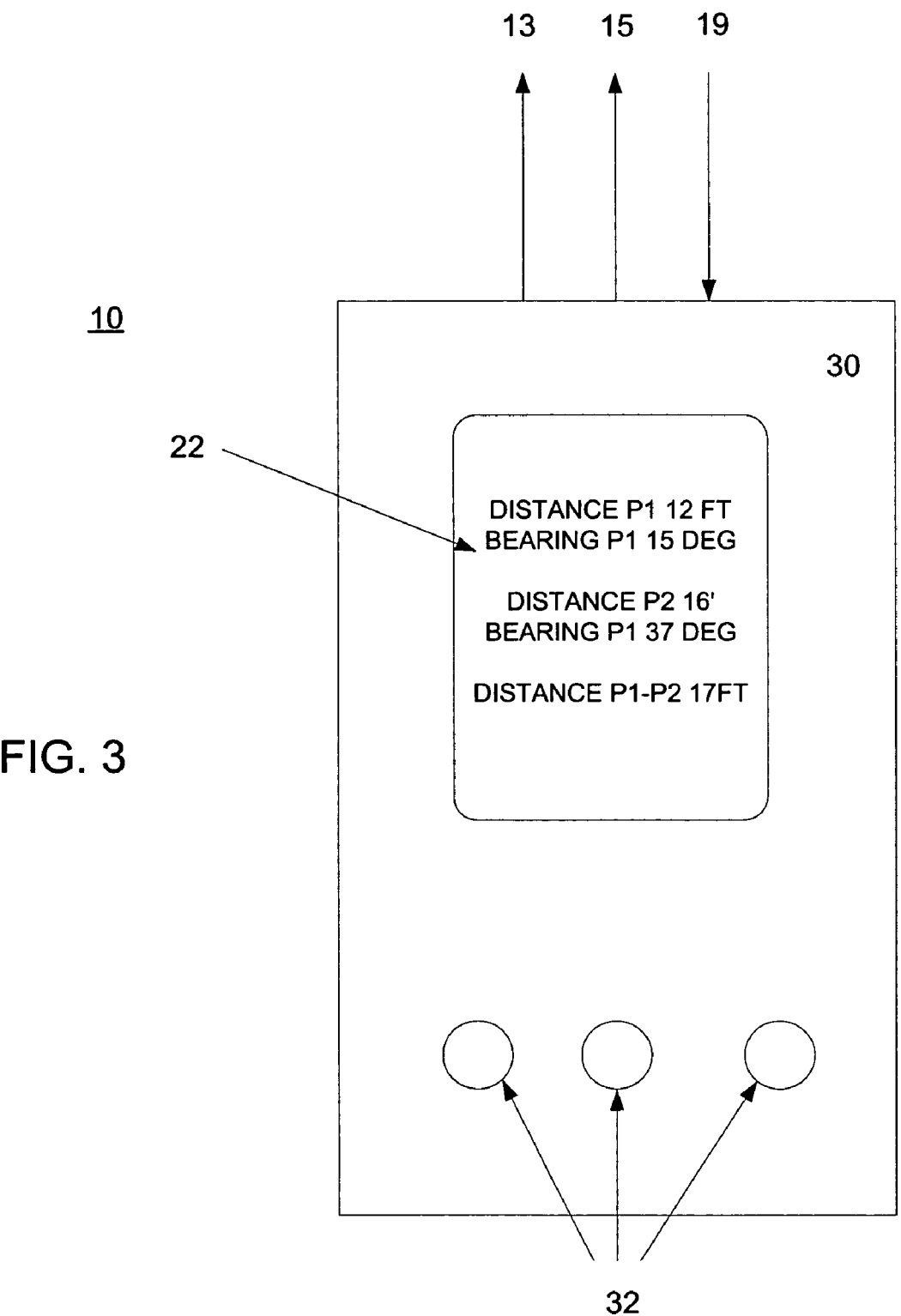
FIG. 3 shows a plan view of the device of FIGS. 1 and 2.

FIG. 3 shows a plan view of the device 10. It includes a housing 30 with at least one screen 22 and one or more keys 32 that include the pushbutton 14 discussed above. One end, the housing has a window (not shown) through which beams 13, 15 are emitted and beam 19 is received. Screen 22 can be used to display all the parameters and results discussed above, either serially, or the screen can be made large enough to display either all, or a subset of the parameters and results.

Numerous modifications may be made to the claims without departing from its scope as defined in the appended claims.

We claim:

1. A device for measuring the distance between two target points comprising:
   means for determining the lengths A, B of two reference lines between a reference point and the arbitrary points;
   means for determining the vertical angles VA, VB of each line with respect to a vertical axis;
   means for determining the orientation angles OA, OB of each line with respect to a horizontal axis; and
   means for calculating the distance between the points from said lengths A, B and said angles VA, VB, OA, OB.

2. The device of claim 1 wherein said means for determining said lengths includes a beam generator generating target beams at said points.

3. The device of claim 2 wherein said means for determining said lengths includes an aiming beam generator for generating an aiming beam used to aid targeting said target point.

4. The device of claim 2 further comprising sensor means for sensing a reflected beam corresponding to said target beam from said target point.

5. The device of claim 2 wherein said target beam is one of a collimated light beam, a laser beam and an ultrasonic beam.

6. The device of claim 1 wherein said horizontal axis is aligned toward the geographic North pole.

7. A measuring device comprising:
   a beam generator selectively directing a beam at a point;
   a first angle detector detecting a vertical angle between the beam and a vertical reference axis;
   a second angle detector detecting a horizontal angle between said first beam and an axis directed at the geographic North pole;
   a calculator calculating the distance to said point using said beam; and
   a display displaying at least one of said distance, said vertical angle and said horizontal angle.

8. The device of claim 7 wherein said beam generator targets a first beam at a first point and a second point, wherein said angle detectors detect a first vertical angle, a second vertical angle, a first horizontal angle and a second horizontal angle corresponding to said first and second beams and said calculator determines a first and a second distance to said first and second points.

9. The device of claim 7 further comprising an aiming beam generator for targeting said target beam.

10. A measuring device comprising:
    a beam generator selectively directing a beam at a point;
    a first angle detector detecting a vertical angle between the beam and a vertical reference axis;
    a second angle detector detecting a horizontal angle between said first beam and a horizontal axis;
    a calculator calculating the distance to said point using said beam; and
    a display displaying at least one of said distance, said vertical angle and said horizontal angle;
    wherein said beam generator targets a first beam at a first point and a second point, wherein said angle detectors detect a first vertical angle, a second vertical angle, a first horizontal angle and a second horizontal angle corresponding to said first and second beams and said calculator determines a first and a second distance to said first and second points; and
    wherein said calculator further determines a third distance between said first and second points based on said angles and said first and second distances.

11. The device of claim 10 wherein said third distance is displayed on said display.

12. A method for measuring a distance between a first and a second point using a measuring device incorporating a beam generator, a vertical angle detector and a horizontal angle detector comprising:
    generating a first targeting beam with said beam generator;
    directing said first targeting beam at a first point;
    measuring the distance A to said first point;
    measuring a vertical angle VA between said first targeting beam and a vertical axis;
    measuring a horizontal angle OA between said first targeting beam and a horizontal axis;
    repeating the above steps with a second targeting beam to obtain a distance B, a vertical angle VB and a horizontal angle OB; and
    calculating the distance between the two points using the parameters A, B, VA, VB, OA and OB.

13. The method of claim 12 wherein said horizontal axis is aligned toward the North pole.

14. The method of claim 12 further comprising generating an aiming beam for aiding the targeting of said targeting beams.

* * * * *